United States Patent
Zhao

(10) Patent No.: US 8,695,665 B2
(45) Date of Patent: Apr. 15, 2014

(54) TIRE WITH COMPOSITE OF CHAFER AND OUTER SIDEWALL RUBBER LAYER COMPONENTS

(75) Inventor: Junling Zhao, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 13/529,139

(22) Filed: Jun. 21, 2012

(65) Prior Publication Data

US 2013/0340909 A1 Dec. 26, 2013

(51) Int. Cl.
- *B60C 1/00* (2006.01)
- *B60C 15/06* (2006.01)
- *C08L 7/00* (2006.01)
- *C08L 9/00* (2006.01)
- *C08L 9/06* (2006.01)
- *C08F 136/00* (2006.01)

(52) U.S. Cl.
USPC ......... 152/525; 152/543; 524/572; 526/340.4

(58) Field of Classification Search
USPC ................. 152/525, 543; 524/572; 526/340.4
See application file for complete search history.

(56) References Cited

U.S. PATENT DOCUMENTS

| | | | |
|---|---|---|---|
| 3,794,604 A | 2/1974 | Throckmorton et al. | 252/431 C |
| 4,242,232 A | 12/1980 | Sylvester et al. | 252/429 C |
| 4,444,903 A | 4/1984 | Carbonaro et al. | 502/102 |
| 4,533,711 A | 8/1985 | Takeuchi et al. | 526/340.4 |
| 5,567,784 A | 10/1996 | Wider et al. | 526/164 |
| 6,780,948 B2 | 8/2004 | Rachita et al. | 526/164 |
| 7,956,146 B2 * | 6/2011 | Zhao et al. | 526/340.4 |
| 2012/0029114 A1 * | 2/2012 | Francik et al. | 523/156 |

* cited by examiner

*Primary Examiner* — Ling Choi
*Assistant Examiner* — Ronald Grinsted
(74) *Attorney, Agent, or Firm* — Henry C. Young, Jr.

(57) ABSTRACT

The invention relates to a tire having a component composed of a composite of rubber chafer and outer sidewall layer components comprised of rubber compositions containing the same or different specialized cis 1,4-polybutadiene elastomers.

18 Claims, 1 Drawing Sheet

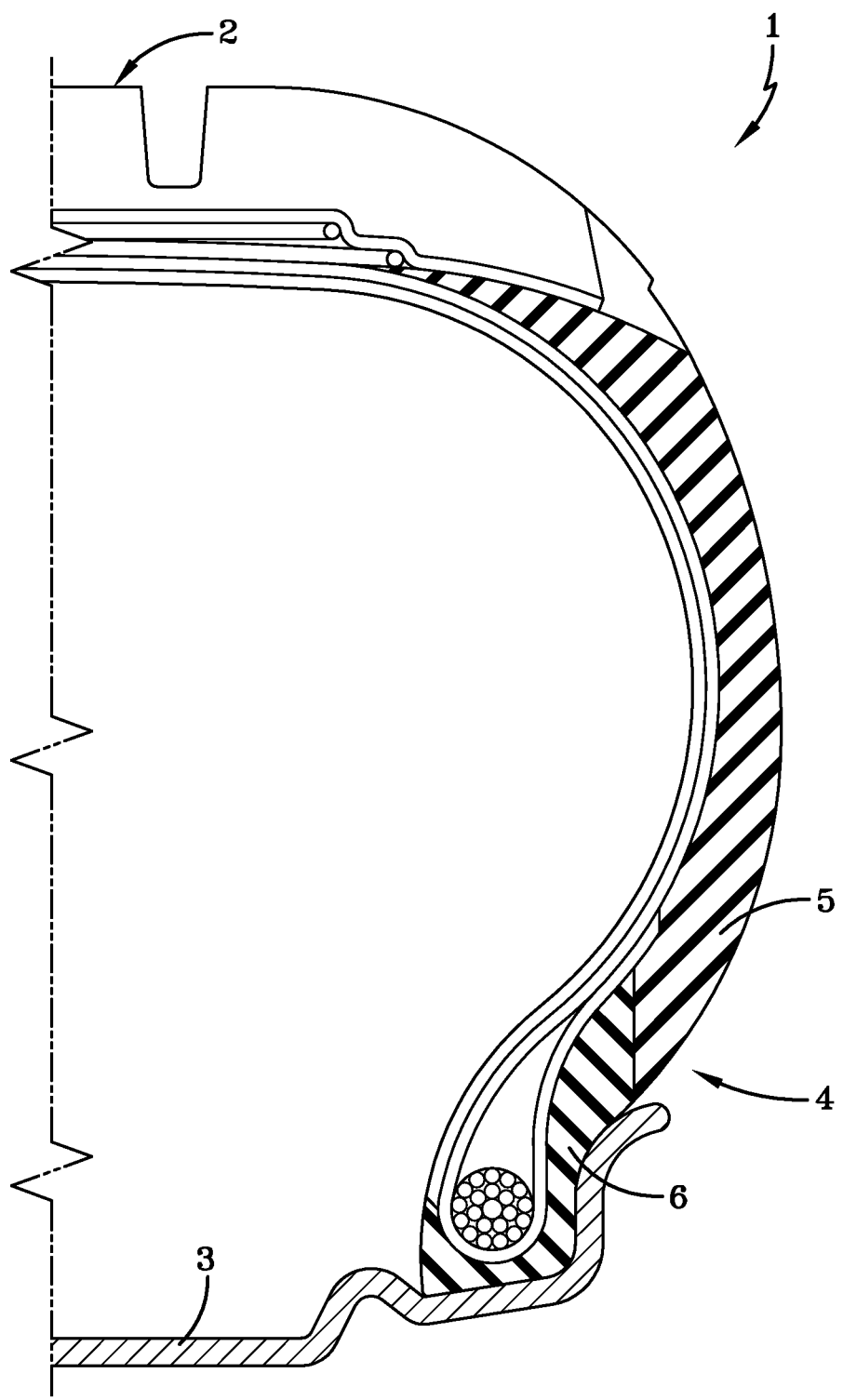

TIRE WITH COMPOSITE OF CHAFER AND OUTER SIDEWALL RUBBER LAYER COMPONENTS

FIELD OF THE INVENTION

The invention relates to a tire having a component composed of a composite of rubber chafer and outer sidewall layer components individually comprised of rubber compositions containing the same or different specialized cis 1,4-polybutadiene elastomers.

BACKGROUND OF THE INVENTION

The chafer component and outer sidewall rubber layer are important components of a pneumatic tire. The chafer component is important for connecting the tire to a rigid wheel rim and the outer rubber sidewall layer is important for protecting the tire sidewall which experiences atmospheric conditions during its normally extensive flexing as the tire is driven. Both tire components can, if desired, beneficially contribute to a reduction in internal heat generation and ultimate rolling resistance of the tire.

The chafer component is a rubber layer located in the bead region, or portion, of the tire which is used to seat the tire against a rigid wheel rim to form a tire/wheel assembly.

The outer sidewall rubber layer is located on the outer, atmospherically exposed, portion of the tire sidewall. The outer sidewall rubber layer (component) does not contain cord reinforcement. The tire's outer sidewall rubber layer refers to an outer tire sidewall rubber layer normally positioned on an outer portion of the tire sidewall, and therefore is a rubber layer which overlays and is not composed of the entire sidewall structure itself, and is exclusive of an apex or internal sidewall stiffening element contained in the tire sidewall, so that it is therefore outside of (axially outward from) the tire carcass ply layers, which themselves contain cord reinforcement. In this manner, the outer sidewall rubber layer is both usually visually observable and atmospherically exposed. Such sidewall outer rubber layer is usually subject to extensive flexing during the operation of the tire as is known to those having skill in such art and may be subject to, for example, one or more of fatigue resistance, cut growth resistance and ozone degradation resistance.

In practice, a pneumatic tire may be provided with a composite comprised of a chafer component and sidewall outer rubber layer as a co-extruded, unitary, composite with each of the chafer and adjoining rubber outer sidewall layer being comprised of the same or different rubber compositions. The composite is sulfur cured with the remainder of the rubber tire components to form an integral composite of the adjoining chafer and outer tire sidewall rubber layers.

A challenge is presented for providing a composite composed of both the chafer and outer sidewall rubber layer components for a tire intended for heavy duty service which are individually composed of rubber compositions which promote a reduction in hysteresis (e.g. reduction in hysteresis energy loss and thereby a reduction in internal heat generation during service, ultimately with a predictive promotion of beneficial relative lower rolling resistance for a pneumatic rubber tire with such composite).

A reduction in hysteresis is generally evidenced by an increase in its rebound physical property to thereby beneficially promote a reduction in internal heat generation within the chafer and outer sidewall components during the working of the tire during associated vehicular operation, particularly for heavy duty service of the tire.

In other words, lower hysteretic energy loss is typically evidenced by a higher rebound physical property of the rubber composition. Lower hysteretic energy loss is predictive of a beneficially lower rolling resistance of a tire with having such composite of chafer and outer sidewall rubber components with a predictive consequentially beneficial increased fuel economy for an associated vehicle.

To promote a higher rebound physical property of the rubber composition of the outer sidewall rubber layer or chafer component, (e.g. to promote a lower hysteresis property of the rubber composition), a reduction in its reinforcing filler content may be used such as, for example, a reduction in its rubber reinforcing carbon black content.

However, reducing the tire sidewall outer rubber layer's hysteresis by reducing its rubber reinforcing carbon black content may also result in a reduction of one or more other desirable physical properties such as, for example, a stiffness property.

It is therefore desirable to evaluate a means of providing a composite of individual outer tire sidewall rubber layer and chafer components with an increased rebound physical properties which is predictive of reduced hysteresis physical properties, as well as a desirable reduction in their tangent delta (tan delta) physical properties, promote an associated reduction in internally induced heat buildup with a desirable consequentially predictive beneficially reduced rolling resistance for a tire with an associated vehicular increase in fuel economy.

Accordingly, for such challenge, an evaluation is to be undertaken of providing a composite of a combination of integrally adjoining chafer and outer sidewall components for the tire with individual rubber compositions for each of the components containing the same or different specialized polybutadiene elastomers.

As indicated, a purpose of such undertaking is to promote a reduced hysteresis property (reduced hysteresis energy loss) loss for both of the sidewall and chafer rubber compositions.

In practice, elastomers for an outer tire sidewall rubber layer and chafer component are often comprised of a mixture, or blend, of natural cis 1,4-polyisoprene rubber and cis 1,4-polybutadiene rubber. Particulate reinforcement for the rubber composition in a form of rubber reinforcing carbon black, and sometimes precipitated silica, is often used.

For this invention, use of specialized cis 1,4-polybutadiene elastomers is to be evaluated.

The specialized cis 1,4-polybutadiene elastomers are comprised of first and second cis 1,4-polybutadiene elastomers prepared by organic solution polymerization of 1,3-butadiene monomer in the presence of a neodymium based catalyst.

For the tire outer sidewall rubber layer component, use of a first specialized cis 1,4-polybutadiene rubber (elastomer) to be evaluated having a microstructure containing about 96 to about 99 percent cis 1,4-isomeric units, a vinyl content in a range of from about 0.2 to about 0.8 percent, a number average molecular weight (Mn) in a range of from about 200,000 to about 350,000, with less than 10, alternately about zero, percent having a number average molecular weight of less than 100,000, and with a Mw/Mn heterogeneity index (ratio of weight average molecular weight to number average molecular weight) in a range of from about 1.4/1 to about 2.1/1.

For the tire chafer component, use of a second specialized cis 1,4-polybutadiene rubber (elastomer) is to be evaluated having a microstructure containing about 96 to about 99 percent cis 1,4-isomeric units, a vinyl content in a range of from about 0.2 to about 0.8 percent, a number average molecular weight (Mn) in a range of from about 150,000 to about 300,000, with less than 10, alternately in a range of from about 2 to about 10, percent having a number average molecular weight of less than 100,000, and with a Mw/Mn heterogeneity index (ratio of weight average molecular weight to number average molecular weight) in a range of from about 1.4/1 to about 2.1/1 (a relatively moderate heterogeneity index range illustrating a moderate disparity between its number average and weight average molecular weights).

In a desirable embodiment the molecular weight (Mn) of the first specialized cis 1,4-polybutadiene rubber is greater than the molecular weight (Mn) of the second specialized cis 1,4-polybutadiene rubber such as, for example, wherein the molecular weight (Mn) of said first specialized cis 1,4-polybutadiene rubber is at least 30,000 greater than the molecular weight (Mn) of said second specialized cis 1,4-polybutadiene rubber.

In a desirable embodiment, the low average molecular weight (Mn) content (content below an Mn of 100,000) of the second specialized cis 1,4-polybutadiene rubber is greater than such low average molecular weight (Mn) content of the first specialized cis 1,4-polylbutadiene rubber by at least 2 percentage points such as, for example where the average low molecular weight (Mn) content below 100,000 for the first specialized cis 1,4-polybutadiene rubber is about zero percent, then such average low molecular weight Mn content below 100,000 for the second specialized cis 1,4-polybutadiene rubber is at least 2 percent and therefore at least 2 percentage points.

Historically, various polybutadiene elastomers (and polyisoprene elastomers) based on polymerizing 1,3-butadiene monomer with various neodymnium catalyst combinations have been previously presented. For example, and not intended to be limiting, see U.S. Pat. Nos. 3,794,604 and 6,780,948.

Historically, various tire components, including tire sidewalls, have been suggested which contain polybutadiene elastomers based on polymerizing 1,3-butadiene monomer with various neodymnium catalyst combinations.

In the description of this invention, the term "phr" where used relates to parts by weight of an ingredient per 100 parts by weight of rubber, unless otherwise indicated.

The terms "rubber" and "elastomer" are used interchangeably unless otherwise indicated. The terms "vulcanized" and "cured" are used interchangeably unless otherwise indicated. The terms "compound" and "rubber composition" may be used interchangeably unless indicated.

SUMMARY AND PRACTICE OF THE INVENTION

In accordance with this invention a pneumatic tire is provided having a composite of a combination of outer rubber sidewall layer and chafer component, where said rubber sidewall layer extends radially outward from said chafer component, wherein each of said rubber sidewall layer and chafer component are rubber compositions containing specialized cis 1,4-polybutadiene elastomer(s) comprised of, based on parts by weight per 100 parts by weight of rubber (phr):

(A) 100 phr of conjugated diene-based elastomers comprised of:
 (1) specialized cis 1,4-polybutadiene elastomer, and
 (2) additional conjugated diene based elastomer (in addition to said specialized cis 1,4-polybutadiene elastomer) comprised of at least one of polymers of at least one of isoprene and 1,3-butadiene and copolymers of styrene and at least one of isoprene and 1,3-butadiene, and (B) rubber reinforcing filler comprised of
 (1) rubber reinforcing carbon black, or
 (2) combination of rubber reinforcing carbon black and synthetic amorphous silica (precipitated silica), and:

(C) coupling agent for said precipitated silica, when said precipitated silica is used, having a moiety reactive with hydroxyl groups on said precipitated silica (e.g. silanol groups) and another different moiety interactive with said elastomer(s);

wherein said specialized cis 1,4-polybutadiene elastomers are comprised of:
 (1) a first specialized cis 1,4-polybutadiene elastomer having a microstructure comprised of about 94 to about 99 percent cis 1,4-isomeric units and a vinyl 1,2-content of less than one percent, alternately in a range of from about 0.2 to about 0.8 percent, a number average molecular weight (Mn) in a range of from about 180,000 to about 350,000 with less than 5, alternately about zero, percent, of the rubber having a weight average molecular weight (Mw) of less than 100,000; and a heterogeneity index (Mw/Mn) in a range of from about 1.4/1 to about 2/1, and
 (2) a second specialized cis 1,4-polybutadiene having a microstructure comprised of about 94 to about 99 percent cis 1,4-isomeric units and a vinyl 1,2-content of less than one percent, alternately in a range of from about 0.2 to about 0.8 percent, a number average molecular weight (Mn) in a range of from about 150,000 to about 300,000 with less than 10, alternately from about 2 to about 10, percent, of the rubber having a weight average molecular weight (Mw) of less than 100,000; and a heterogeneity index (Mw/Mn) in a range of from about 1.4/1 to about 2/1;

wherein the specialized cis 1,4-polybutadiene rubber for said rubber sidewall layer and said chafer component of said composite is:
 (3) said first specialized cis 1,4-polybutadiene rubber, or
 (4) said second specialized cis 1,4-polybutadiene rubber.

In one embodiment, said specialized cis 1,4-polybutadiene rubber for said chafer component of said composite is said second specialized cis 1,4-polybutadiene rubber.

In one embodiment, said specialized cis 1,4-polybutadiene rubber for said rubber sidewall layer of said composite is:
 (A) said second specialized cis 1,4-polybutadiene rubber, or
 (B) said first specialized cis 1,4-polybutadiene rubber.

In one embodiment, said reinforcing filler for said tire sidewall rubber layer of the composite is (preferably consists of) rubber reinforcing carbon black (e.g. without silica reinforcement and silica coupling agent and preferably at least to the percolation threshold content of the rubber reinforcing carbon black).

The term "percolation threshold" content of the rubber reinforcing carbon black is the minimum content sufficient to provide electrical conductivity for the inherently electrically insulative rubber composition to enable conduction of electrical energy. A percolation threshold is somewhat dependent upon the particle size of the carbon black and the rubber composition surrounding the carbon black. It is often in a range of from about 30 to about 35 phr of rubber reinforcing carbon black. A discussion of electrical conductivity relative to "percolation threshold" may be found, for example, in a presentation entitled "Electrical Conduction in Carbon Black Composites" by Avrom Medalia, Rubber Division of the American Chemical Society, Los Angles, Calif., Apr. 23 through 25, 1985.

In one embodiment, said reinforcing filler for said tire sidewall rubber layer of the composite is a combination of at least about 30 phr of rubber reinforcing carbon black (preferably at least to a percolation threshold content of carbon black) and up to 50 phr precipitated silica (e.g. from 10 to 50 phr of precipitated silica), together with silica coupling agent.

In one embodiment, said reinforcing filler for said chafer component rubber composition is a combination of at least 30 phr of rubber reinforcing carbon black (preferably at least to the percolation threshold content) and precipitated silica (e.g. where said reinforcing filler contains from about 10 to about 50 phr of precipitated silica) together with silica coupling agent.

As previously indicated, in a desirable embodiment, the average molecular weight (Mn) of said first specialized cis 1,4-polybutadiene rubber is at least 30,000 greater than the average molecular weight (Mn) of said second specialized cis 1,4-polybutadiene rubber.

As previously indicated, in a desirable embodiment, the average molecular weight (Mn) content of below 100,000 of the second specialized cis 1,4-polybutadiene rubber is at least 2 percentage points greater than the average molecular weight (Mn) content of below 100,000 for the first specialized cis 1,4-polylbutadiene rubber, for example, about zero percent for said first specialized cis 1,4-polybutadiene rubber and least about 2 percent for said second specialized cis 1,4-polybutadiene rubber.

In practice, said first and second specialized cis 1,4-polybutadiene elastomers may be products of, for example, polymerization of cis 1,3-butadiene monomer by neodymium catalysis in the presence of a neodymium based catalyst comprised of, for example as may be appropriate, a combination of neodymium compound comprised of, for example, a neodymium carboxylate, and organoalumium compound which then may be treated with an aluminum chloride delivering compound. Numerous neodymium based catalyst systems and their preparation have been proposed for polymerizing diene monomers. For example, and not intended to be limiting, see U.S. Pat. Nos. 3,794,604, 4,242,232, 4,444,903, 4,533,711 and 6,780,948. For example, as may be appropriate, and not intended to be limiting, such neodymium catalyst systems may be prepared of neodymium compound (particularly a neodymium carboxylate) comprised of neodymium versalate, neodymium octoate, neodymium neodeconate and neodymium 2-ethyl hexanoate, as may be appropriate, organoaluminum compound comprised of, as may be appropriate, and not intended to be limiting, for example, dialkylalumium chloride, such as diethylaluminum chloride, triethylalumium, tir-n-propylalumium, diisobutylaluminum, diethylalumimum hydride, di-n-propylalumium hydride, di-n-butylalumium hydride, diisobutylaluminum hydride, trimethylalumium, to which may be treated, again as may be appropriate and if desired, with an aluminum chloride delivering compound such as, for example and not intended to be limiting, ethylaluminum sesquichloride. For example, such neodymium based catalyst might be based on, at least in part, neodymium versalate and an alkylalumimum compound such as, for example, dialkylalumium hydride or diisobutylalumium.

Said second, specialized cis 1,4-polybutadiene is treated with at least one of sulfur chloride and disulfur dichloride.

Therefore, the first specialized cis 1,4-polybutadiene rubber can be similar to said second specialized cis 1,4-polybutadiene rubber except for a potential molecular weight difference, and low molecular weight content difference to thereby better processing for the uncured rubber composition containing said first specialized cis 1,4-polybutadiene rubber, and, further, that the second specialized cis 1,4-polybutadiene rubber is understood to be treated with, for example, disulfur dichloride, to cause a molecular weight jump (an increase its molecular weight, which might sometimes be referred to a Mooney viscosity jump in the case of the uncured cis 1,4-polybutadiene rubber).

A significant aspect of this invention is the provision of a unitary composite of a combination of outer sidewall rubber layer and chafer component, to promote a lower hysteretic loss the by an inclusion of said specialized cis 1,4-polybutadiene elastomer(s) in their rubber compositions, particularly where the reinforcing filler in the sidewall rubber layer of the composite is rubber reinforcing carbon black and the reinforcing filler in the chafer component of the composite is a combination of precipitated silica and rubber reinforcing carbon black.

For the first specialized cis 1,4-polybutadine elastomer for said sidewall rubber composition, a representative example is CB 22™ from the Lanxess Company.

For the second specialized cis 1,4-polybutadine elastomer for said chafer rubber composition, a representative example is CB 25™ from the Lanxess Company.

In practice, representative of various of said additional diene-based elastomers for the rubber compositions are comprised of, for example, at least one of polyisoprene rubber (both natural polyisoprene rubber such as for example SMR20, namely smoked rubber sheet number 20, and synthetic polyisoprene rubber such as, for example, NAT2200™ from The Goodyear Tire & Rubber Company), styrene/butadiene rubber and non-functionalized cis 1,4-polybutadiene rubber.

A Drawing is provided to provide a further understanding of the invention. dr

BRIEF DESCRIPTION OF DRAWING

A Drawing (FIG. 1) is provided to illustrate a partial cross section of vehicular tire and rim assembly where the tire is depicted with a composite of chafer and outer tire sidewall components.

THE DRAWING

In FIG. 1, a partial cross-section of a tire (1) mounted on a rigid rim (3) is shown to form a vehicular wheel.

The tire 1 is shown as containing a tread (2) and component as a composite (4) composed of a combination of outer rubber sidewall layer (5) and chafer component (6). The outer rubber sidewall layer (5) extents radially outward from the chafer component (6) of the composite (4).

The composite (4) of said rubber sidewall (5) and chafer component (6) are formed by co-extruding the uncured rubber compositions together to form the composite following which the composite (4) is shaped and built into the uncured tire as a component of the tire assembly and the tire assembly molded and cured to form the tire. The composite (4) is composed of an outer, atmospherically exposed, sidewall rubber layer (5) positioned axially outward from the tire carcass plies (not numbered) and extending axially outward from, and joined as an integral unit with, a rubber chafer component (6).

The tire (1) is mounted on the rigid rim (3) by means of its chafer component (6).

For FIG. 1, the tire chafer component (6) of the composite (4) is depicted as being of a rubber composition containing elastomers comprised of a combination of natural rubber and the second specialized cis 1,4-polybutadiene rubber as CB25™ from the Lanxess Company.

For FIG. 1, the outer rubber sidewall rubber layer (5) of the composite (4) extends radially outward from the chafer component (6) and is depicted as being of a rubber composition containing elastomers comprised of a combination of natural rubber and the first specialized cis 1,4-polybutadiene rubber as CB22™ from the Lanxess Company.

It is readily understood by those having skill in the art that the rubber composition can be prepared, or compounded, by methods generally known in the rubber compounding art, such as, for example, mixing the various sulfur-vulcanizable constituent rubbers with various commonly used additive materials such as, for example, curing aids, such as sulfur, activators, retarders and accelerators, processing additives, such as oils, resins including tackifying resins and plasticizers, pigments, fatty acid, zinc oxide, waxes, antioxidants and antiozonants and peptizing agents. As known to those skilled in the art, depending on the intended use of the sulfur vulcanizable and sulfur vulcanized material (rubbers), the additives mentioned above are selected and commonly used in conventional amounts.

The presence and relative amounts of the above additives are not considered to be an aspect of the present invention, unless otherwise indicated herein.

The tires can be built, shaped, molded and cured by various methods which will be readily apparent to those having skill in such art.

The following examples are provided to further illustrate the invention where amounts and percentages of materials are presented in terms of weight unless otherwise indicated.

EXAMPLE I

Outer Sidewall Rubber Component

Rubber compositions (rubber compounds) containing carbon black reinforcement filler were prepared to evaluate use of cis 1,4-polybutadiene elastomer prepared by nickel based catalysis and specialized cis 1,4-polybutadiene elastomers prepared by neodymium based catalysis.

Rubber compositions A and B are Control rubber compositions which are based on elastomers comprised of a combination of natural rubber and cis 1,4-polybutadiene rubber where the cis 1,4-polbutadiene rubber is a nickel based catalysis prepared cis 1,4-polybutadiene rubber.

Experimental rubber Composition C was based on elastomers comprised of a combination of natural rubber and a second specialized cis 1,4-polybutadiene rubber, where the second specialized cis 1,4-polybutadiene rubber is CB25™ from the Lanxess Company prepared by polymerizing 1,3-butadiene monomer in the presence of a neodymium based catalyst system and treating the elastomer with, for example, disulfide dichloride ($S_2Cl_2$).

Experimental rubber Composition D was based on elastomers comprised of a combination of natural rubber and a first specialized cis 1,4-polybutadiene rubber, where the first specialized cis 1,4-polybutadiene rubber is CB22™ from the Lanxess Company prepared by polymerizing 1,3-butadiene monomer in the presence of a neodymium based catalyst system.

The rubber compositions were prepared by mixing the ingredients in three sequential mixing steps, namely two non-productive (NP1 and NP2) followed by a productive mixing step (PR) in an internal rubber mixer. The dump temperature from the internal rubber mixer after completing the NP1 and NP2 mixing steps was 160° C. The dump temperature after completing the subsequent PR mixing step was 110° C.

For this Example, both of the carbon black and silica reinforcement fillers as well as the silica coupling agent were added in the NP1 non-productive mixing stage with the respective cis 1,4-polybutadiene elastomers.

The basic recipe for the rubber compounds is presented in the following Table 1 and recited in parts by weight unless otherwise indicated.

TABLE 1

|  | Parts |
|---|---|
| First Non-Productive Mixing Step (NP1), mixed to about 160° C. | |
| Cis 1,4-Polyisoprene natural rubber[1] | 50 or 60 |
| Cis 1,4-polybutadiene elastomer[2] (nickel catalysis prepared) | 0, 40 or 50 |
| First specialized cis 1,4-polybutadiene elasomer[3] (CB22) | 0 and 40 |
| Second specialized cis 1,4-polybutadiene elastomer[4] (CB25) | 0 and 40 |
| Carbon black N330, an ASTM designation | 37 or 45 |
| Rubber processing oil | 0 or 5.2 |
| Wax and antioxidant | 8.5 and 10.5 |
| Fatty acid[5] | 1 or 1.5 |
| Zinc oxide | 3 |
| Second Non-Productive Mixing Step (NP2), mixed to about 160° C. | |
| No ingredients added in this mixing step, sometimes referred to as "re-milling" | |
| Productive Mixing Step (PR), (mixed to about 110° C.) | |
| Sulfur | 1 |
| Antioxidant | 1.4 |
| Sulfenamide and diphenylguanidine sulfur cure accelerators | 1.4 |
| Sulfur cure retarder[6] | 0 and 0.2 |

[1]Natural rubber as SMR20 having a cis 1,4 content of about 99.8 percent and a Tg of about –65° C.
[2]Nickel catalyst prepared cis 1,4-polybutadiene rubber as BUD 1207 ™ from the Goodyear Tire & Rubber company having a Tg of about –106° C., a microstructure comprised of about 98 percent cis 1,4-isomeric units and vinyl content of about 1.4 percent and a number average molecular weight (Mn) of about 220,000 with a significant portion of the elastomer, namely about 13 percent, having a weight average molecular weight (Mw) of less than 100,000 and a heterogeneity index (Mw/Mn) of about 3/1 prepared by polymerizing 1,3-butadiene monomer with a nickel based catalyst.
[3]First specialized cis 1,4-polybutadiene rubber, a neodymium catalyst prepared cis 1,4-polybutadiene as CB22 ™ from the Lanxess Company having a Tg of about –108° C., a microstructure comprised of about 96 percent cis 1,4-isomeric units and vinyl content of about 0.4 percent and a number average molecular weight (Mn) of about 292,000 with only a minimal amount of the elastomer, if any, namely about zero percent, having a weight average molecular weight (Mw) of less than 100,000 and a heterogeneity index (Mw/Mn) of about 1.6/1 prepared by polymerizing 1,3-butadiene monomer in an organic solvent solution in the presence of a neodymium based catalyst comprised of, for example, a neodymium compound (e.g. neodymium versalate), an aluminum alkyl (e.g. diisobutylalumium) and an aluminum chloride delivering compound (e.g. ethylalumium sequichloride).
[4]Second specialized cis 1,4-polybutadiene rubber, a neodymium catalyst prepared cis 1,4-polybutadiene as CB25 ™ from the Lanxess Company having a Tg of about –107° C., a microstructure comprised of about 97 percent cis 1,4-isomeric units and vinyl content of about 0.5 percent and a number average molecular weight (Mn) of about 240,000 with only a very small portion of the elastomer, namely about 3 percent, having a weight average molecular weight (Mw) of less than 100,000 and a heterogeneity index (Mw/Mn) of about 1.8/1 prepared by polymerizing 1,3-butadiene monomer in an organic solvent solution in the presence of a neodymium based catalyst where it is understood that the polymer has been coupled in the presence of a sulfur chloride such as, for example, disulfur dichloride, where the neodymium based catalyst is comprised of, for example, a neodymium compound (e.g. neodymium versalate), an aluminum alkyl (e.g. diisobutylalumium) and an aluminum chloride delivering compound (e.g. ethylalumium sesquichloride).
[5]Fatty acid comprised of stearic, palmitic and oleic acids
[6]Sulfur cure retarder as N-cyclohexylthiophthalimide The following Table 2 illustrates processing characteristics and various physical properties of rubber compositions based upon the basic recipe of Table 1.

TABLE 2

| | Rubber Compound Samples | | | |
|---|---|---|---|---|
| | Control | Experimental | | |
| | A | B | C | D |
| Elastomers (phr) | | | | |
| Natural cis 1,4-polyisoprene | 50 | 60 | 60 | 60 |
| Cis 1,4-polybutadiene (nickel catalysed) | 50 | 40 | 0 | 0 |
| First specialized cis 1,4-polybutadiene (CB22) | 0 | 0 | 0 | 40 |
| Second specialized cis 1,4-polybutadiene (CB25) | 0 | 0 | 40 | 0 |
| Carbon black (N330) | 45 | 37 | 37 | 37 |
| RPA Analyzer[1], 100° C. | | | | |
| Uncured G' at 0.83 Hz, 1% strain (MPa) | 0.204 | 0.185 | 0.182 | 0.207 |
| Cured G' at 1 Hz, 10% strain (MPa) | 0.783 | 0.641 | 0.677 | 0.715 |
| Tan delta at 10% strain | 0.148 | 0.123 | 0.120 | 0.111 |
| Stress-strain, ATS[2], 11 min, 170° C.[2] | | | | |
| Tensile strength (MPa) | 17.8 | 18.2 | 18.8 | 17.7 |
| Elongation at break (%) | 727 | 736 | 726 | 679 |
| 100% modulus, ring (MPa) | 1.16 | 1.04 | 1.07 | 1.12 |
| 300% modulus, ring (MPa) | 4.79 | 4.27 | 4.43 | 4.62 |
| Rebound | | | | |
| 23° C. | 50 | 53 | 55 | 57 |
| 100° C. | 54 | 57 | 58 | 60 |
| Shore A Hardness | | | | |
| 23° C. | 52 | 48 | 47 | 50 |
| 100° C. | 45 | 42 | 42 | 44 |
| Tear Strength[3], N | | | | |
| At 95° C. | 283 | 250 | 234 | 221 |
| Demattia Cut Growth Rate[4], min/mm | | | | |
| 95° C. | 153 | 157 | 170 | 143 |
| Aged 5 days at 100° C., tested at 95° C. | 99 | 111 | 43 | 67 |

[1] Data according to Rubber Process Analyzer "RPA"
[2] Data according to Automated Testing System (ATS) instrument.
[3] Data obtained according to a tear strength (peal adhesion) test to determine interfacial adhesion between two samples of a rubber composition. In particular, such interfacial adhesion is determined by pulling one rubber composition away from the other at a right angle to the untorn test specimen with the two ends of the rubber compositions being pulled apart at a 180° angle to each other using an Instron instrument at 95° C. and reported as Newtons force.
[4] ASTM D813

It can be seen from Table 2 that both low and high temperature rebound property values (23° C. and 100° C.) for rubber Samples C and D, which individually contained 40 phr of each of the specialized cis 1,4-polybutadiene elastomers, greatly improved (increased) as compared to Control rubber Sample A which contained 50 phr of the nickel catalysis prepared cis 1,4-polybutadiene rubber and somewhat improved as compared to Control rubber Sample B which contained 40 phr of the nickel catalysis prepared cis 1,4-polybutadiene rubber.

It can also be seen that the tan delta property for rubber Samples C and D, which individually contained 40 phr of each the specialized cis 1,4-polybutadiene elastomers, greatly improved (decreased) as compared to both of Control rubber Samples A and B which contained 50 and 40 phr, respectively, of the nickel catalysis prepared cis 1,4-polybutadiene rubber.

It is concluded from such combination of (1) increased rebound values and (2) decreased tan delta values, that rubber Samples C and D, which contained the specialized cis 1,4-polybutadiene elastomers with carbon black reinforcement filler, are readily predictive of significantly beneficially reduced hysteresis for both of the Sample C and D rubber compositions (as compared to Control rubber Samples A and B) with an associated predictive reduced (lower) internal heat generation and heat build up during working of the rubber compositions and, ultimately, a predictive lower (beneficial) rolling resistance for a tire with an outer rubber sidewall layer of such rubber compositions.

EXAMPLE II

Tire Chafer Component

Rubber compositions, containing a combination of carbon black and precipitated silica reinforcement fillers, were prepared to evaluate replacement of a significant amount of natural rubber (natural cis 1,4-polyisoprene rubber) with various neodymium as well as nickel catalysis prepared cis 1,4-polybutadiene elastomers for a tire chafer.

Rubber compositions are referred in this Example as rubber Samples E, F, G and H.

Rubber Sample E is a Control rubber Sample based on natural rubber with a cis 1,4-polybutadiene rubber prepared by nickel based catalysis which contains a significant low molecular weight fraction, namely more than 20 percent of the elastomer having a low weight average molecular weight (Mw) of less than 100,000.

Rubber Samples F, G and H are Experimental rubber Samples based upon specialized cis 1,4-polybutadiene elastomers prepared by neodymium based catalysis used with a minor amount of the natural rubber.

The basic rubber composition formulation is shown in Table 3 and the ingredients are expressed in parts by weight per 100 parts rubber (phr) unless otherwise indicated.

The rubber compositions are prepared in the manner of Example I.

TABLE 3

| | Parts (phr) | | | |
|---|---|---|---|---|
| | Control | Experimental | | |
| | E | F | G | H |
| Non-Productive Mixing Step (NP), 160° C. | | | | |
| Mixed to 160° C. | | | | |
| Natural cis 1,4-polyisoprene rubber (SMR20) | 30 | 25 | 20 | 20 |
| Cis 1,4-polybutadiene rubber (nickel catalysis)[1] | 70 | 0 | 0 | 0 |
| Second specialized cis 1,4-polybutadiene rubber[2] | 0 | 75 | 80 | 0 |
| First specialized cis 1,4-polybutadiene rubber[3] | 0 | 0 | 0 | 80 |
| Carbon black, rubber reinforcing (N220)[4] | 70 | 0 | 0 | 0 |
| Carbon black, rubber reinforcing (N121)[5] | 0 | 32 | 35 | 35 |
| Silica, precipitated[6] | 0 | 32 | 32 | 32 |
| Silica coupling agent, without carbon black carrier[7] | 0 | 0 | 3.2 | 3.2 |
| Silica coupling agent, as a carbon black composite[8] | 0 | 6.4 | 0 | 0 |
| Wax, microcrystalline and paraffin | 1.5 | 1.5 | 1.5 | 1.5 |
| Fatty acid[9] | 2 | 2 | 2 | 2 |
| Antioxidants | 4.8 | 4.8 | 4.8 | 4.8 |
| Zinc oxide | 3 | 3 | 3 | 3 |
| Rubber processing oil and hydrocarbon resin | 5 | 8 | 8 | 8 |

TABLE 3-continued

|  | Parts (phr) | | | |
|---|---|---|---|---|
|  | Control | Experimental | | |
|  | E | F | G | H |
| Productive Mixing Step (PR), Mixed to 110° C. | | | | |
| Sulfur | 1.5 | 1.8 | 1.5 | 1.5 |
| Sulfur cure accelerator(s)[10] | 2 | 2 | 1.6 | 1.6 |

[1]Nickel based catalyst prepared cis 1,3-butadiene monomer to form a 1,4-polybutadiene rubber as BUD4001 ™ from The Goodyear Tire & Rubber Company, having a Tg or about −103° C., a microstructure comprised of about 97 percent cis 1,4-isomeric units and vinyl 1,2-content of about 1.5 percent, a number average molecular weight (Mn) of about 150,000 with a significant portion of the elastomer, namely about 23 percent, having a weight average molecular weight (Mw) of less than 100,000 and a heterogeneity index (Mw/Mn) of about 3 prepared by polymerizing 1,3-butadiene monomer in an organic solution with a nickel based catalyst.

[2]Second specialized cis 1,4-polybutadiene rubber, as CB25 ™ from the Lanxess Company having a Tg of about −107° C., solution polymerized 1,3-butadiene monomer comprised of about 97 percent cis 1,4-isomeric units and vinyl 1,2-content of about 0.5 percent, a number average molecular weight (Mn) of about 240,000 with only a very small portion of the elastomer, namely about 3 percent, having an weight average molecular weight (Mw) of less than 100,000 and heterogeneity index (Mw/Mn) of about 1.8/1 prepared by polymerizing 1,3-butadiene monomer in a organic solvent solution in the presence of a neodymium based catalyst where the polymer has been coupled in the presence of a sulfur chloride such as, for example disulfur dichloride.

[3]First specialized cis 1,4-polybutadiene rubber, as CB22 ™ from the Lanxess Company having a Tg of about −108° C., comprised of about 96 percent cis 1,4-isomeric units and vinyl 1,2-content about 0.4 percent, a number average molecular weight (Mn) of about 292,000 with only a minimal amount, if any, of the elastomer, namely about zero percent, having an weight average molecular weight (Mw) of less than 100,000 and a heterogeneity index (Mw/Mn) of about 1.6/1 prepared by polymerizing 1,3-butadiene monomer in a organic solvent solution in the presence of a neodymium based catalyst.

[4]Rubber reinforcing carbon black as N220, an ASTM designation

[5]Rubber reinforcing carbon black as N121, an ASTM designation

[6]Precipitated silica as Zeosil ™ Z1165 MP from the Rhodia Company

[7]Coupling agent for the silica comprised of bis(3-triethoxysilylpropyl) polysulfide having an average of from about 2 to about 2.6 connecting sulfur atoms as Si266 ™ from Evonik Degussa

[8]Composite of 50/50 coupling agent for the silica and carbon black carrier, where the coupling agent for the silica is comprised of bis(3-triethoxysilylpropyl) polysulfide having an average of from about 2 to about 2.6 connecting sulfur atoms as Si266 ™ from Evonik Degussa presented in the Table as a composite with the carbon black carrier.

[9]Mixture comprised of stearic, palmitic and oleic acids

[10]Sulfenamide and diphenyl guanidine sulfur cure accelerators

The following Table 4 represents the uncured and cured behavior and various physical properties of the rubber compositions based upon the basic formulation of Table 3, and reported as Control rubber Sample E and Experimental rubber Samples F, G and H.

TABLE 4

|  | Control (phr) | Experimental (phr) | | |
|---|---|---|---|---|
|  | E | F | G | H |
| Natural rubber | 30 | 25 | 20 | 20 |
| Cis 1,4-polybutadiene rubber (nickel catalysis) | 70 | 0 | 0 | 0 |
| Second specialized polybutadiene, namely CB25 ™ | 0 | 75 | 80 | 0 |
| First specialized polybutadiene, namely CB22 ™ | 0 | 0 | 0 | 80 |
| RPA test | | | | |
| Uncured dynamic storage modulus G' (KPa) at 15% strain, 0.83 Hz, 100° C. | 350 | 308 | 355 | 531 |
| Dynamic storage modulus G' (MPa) at 10% strain, 1 Hz, 100° C. | 2.14 | 2.36 | 1.9 | 2.09 |
| Tan delta at 10% strain, 1 Hz, 100° C. | 0.182 | 0.154 | 0.164 | 0.161 |
| MDR test; 60 minutes at 150° C. | | | | |
| Maximum torque (dN-m) | 31.4 | 30.9 | 24.9 | 27.4 |
| Minimum torque (dN-m) | 5.73 | 4.87 | 5.34 | 7.53 |
| T90 (minutes) | 9.97 | 11.7 | 12.8 | 12.3 |
| Stress-strain | | | | |
| Tensile strength (MPa) | 15.7 | 18.1 | 19.2 | 19.6 |
| Elongation at break (%) | 318 | 443 | 542 | 529 |
| 100% modulus, ring, (MPa) | 3.04 | 2.7 | 2.01 | 2.05 |
| 300% modulus, ring, (MPa) | 16.6 | 12.2 | 9.2 | 9.5 |
| Rebound (Zwick) | | | | |
| 23° C. | 43 | 50 | 50 | 51 |
| 100° C. | 58 | 62 | 59 | 60 |
| Shore A Hardness | | | | |
| 23° C. | 76 | 76 | 70 | 70 |
| 100° C. | 70 | 69 | 64 | 64 |
| Tear Strength, N | | | | |
| At 95° C. | 68 | 87 | 144 | 150 |
| Aged 7 days/70° C. at 95° C. | 55 | 74 | 141 | 121 |
| DIN Abrasion[5] (loss of rubber relative to a control) | | | | |
| 23° C. (lower loss is better abrasion resistance) | 60 | 44 | 37 | 31 |

[5]DIN53516

From Table 4 it can be seen that, as compared to Control rubber Sample E, all of Experimental rubber Samples F, G and H using the specialized cis 1,4-polybutadiene elastomers prepared by the neodymium based catalysis of 1,3-butadiene monomer exhibited:

(1) increased ultimate tensile strength and elongation, (2) combination of improved (increased) 23° C. and 100° C. rebound values as well as improved (reduced) tan delta property values, together indicating a better (improved) hysteresis property and thereby predictive beneficially reduced internal heat generation during working of the rubber composition, (3)1 significantly increased tear strength, (4) significantly improved abrasion resistance (resistance to abrasion).

However, it can also be seen for rubber Sample H, which used the first specialized polybutadiene rubber, namely the CB22™ for its primary elastomer, processing of the uncured rubber composition exhibited a significantly increased storage modulus (G') of 531 MPa for the uncured rubber composition thereby indicating significantly increased rubber processing difficulty than all of Control rubber Sample E and Experimental rubber Samples F and G.

Therefore, it is concluded that the evaluation of the rubber compositions, containing a combination of carbon black and precipitated silica reinforcement fillers together with silica coupling agent, demonstrated that the rubber composition containing the second specialized polybutadiene rubber, namely the C25™ polybutadiene, together with both the precipitated silica and rubber reinforcing carbon black reinforcing filler, yielded the better beneficial balance of both cured and uncured rubber properties for use as a chafer component which contains a combination of both carbon black and precipitated silica reinforcement fillers, for a tire intended for heavy duty use.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having a composite consisting of a combination of outer rubber sidewall layer and chafer component, where said rubber sidewall layer is integral with and extends radially outward from said chafer component, wherein each of said sidewall layer and chafer component are rubber compositions containing specialized cis 1,4-polybutadiene elastomer(s) comprised of, based on parts by weight per 100 parts by weight of rubber (phr):

(A) 100 phr of conjugated diene-based elastomers comprised of:
      (1) cis 1,4-polybutadiene rubber consisting of specialized cis 1,4-polybutadiene elastomer, and
      (2) additional conjugated diene based elastomer comprised of at least one of cis 1,4-polyisoprene rubber and styrene/butadiene rubber, and
   (B) rubber reinforcing filler comprised of
      (1) rubber reinforcing carbon black, or
      (2) combination of rubber reinforcing carbon black and precipitated silica, and:
   (C) coupling agent for said precipitated silica, when said precipitated silica is used, having a moiety reactive with hydroxyl groups on said precipitated silica and another different moiety interactive with said elastomer(s);
   wherein said specialized cis 1,4-polybutadiene elastomers consist of:

(1) a first specialized cis 1,4-polybutadiene elastomer having a microstructure comprised of about 94 to about 99 percent cis 1,4-isomeric units and a vinyl 1,2-content of less than one percent a number average molecular weight (Mn) in a range of from about 180,000 to about 350,000 with less than 5 percent, of the rubber having a weight average molecular weight (Mw) of less than 100,000; and a heterogeneity index (Mw/Mn) in a range of from about 1.4/1 to about 2/1, and (2) a second specialized cis 1,4-polybutadiene having a microstructure comprised of about 94 to about 99 percent cis 1,4-isomeric units and a vinyl 1,2-content of less than one percent a number average molecular weight (Mn) in a range of from about 150,000 to about 300,000 with less than 10 percent, of the rubber having a weight average molecular weight (Mw) of less than 100,000; and a heterogeneity index (Mw/Mn) in a range of from about 1.4/1 to about 2/1;

wherein the specialized cis 1,4-polybutadiene rubber for said sidewall component [and said chafer component] of said composite is:
      (3) said first specialized cis 1,4-polybutadiene rubber, or
      (4) said second specialized cis 1,4-polybutadiene rubber, and
   wherein the specialized cis 1,4-polybutadiene rubber for said chafer component of said composite is:
      (5) said second specialized cis 1,4-polybutadiene rubber.

2. The tire of claim 1 where said rubber sidewall layer extends radially outward from chafer component.

3. The tire of claim 1 wherein said reinforcing filler for said tire sidewall rubber layer of the composite consists of rubber reinforcing carbon black.

4. The tire of claim 3 where the rubber reinforcing carbon black content in said sidewall rubber layer is at least 30 phr.

5. The tire of claim 3 where the rubber reinforcing carbon black content in said sidewall rubber layer is at least an electrical conductivity percolation threshold content.

6. The tire of claim 1 wherein said reinforcing filler for said tire sidewall rubber layer of the composite is a combination of at least 30 phr of rubber reinforcing carbon black and up to 50 phr of precipitated silica.

7. The tire of claim 6 where the rubber reinforcing carbon black content in said sidewall rubber layer is at least an electrical conductivity percolation threshold content.

8. The tire of claim 1 wherein said reinforcing filler for said chafer component rubber composition is said combination of rubber reinforcing carbon black and precipitated silica together with silica coupling agent.

9. The tire of claim 7 wherein said reinforcing filler is comprised of at least 30 phr said rubber reinforcing carbon black and from about 10 to about 50 phr of precipitated silica together with silica coupling agent.

10. The tire of claim 9 where the rubber reinforcing carbon black content for said chafer component is at least an electrical conductivity percolation threshold content.

11. The tire of claim 1 wherein:
   (A) said specialized cis 1,4-polybutadiene for said tire sidewall rubber layer is said first specialized cis 1,4-polybutadiene,
   (B) said specialized cis 1,4-polybutadiene for said chafer component is said [first or] second specialized cis 1,4-polybutadiene,
   (C) said reinforcing filler for said tire sidewall rubber layer of the composite is rubber reinforcing carbon black, and (D) said reinforcing filler for said chafer component rubber composition is said combination of rubber reinforcing carbon black and precipitated silica together with silica coupling agent.

12. The tire of claim 1 wherein:
(A) the average molecular weight (Mn) of said first specialized cis 1,4-polybutadiene rubber is at least 30,000 greater than the average molecular weight (Mn) of said second specialized cis 1,4-polybutadiene rubber, and
(B) the average molecular weight (Mn) content of below 100,000 of the second specialized cis 1,4-polybutadiene rubber is at least 2 percentage points greater than the average molecular weight (Mn) content of below 100,000 for the first specialized cis 1,4-polybutadiene rubber.

13. The tire of claim 11 wherein:
(A) the average molecular weight (Mn) of said first specialized cis 1,4-polybutadiene rubber is at least 30,000 greater than the average molecular weight (Mn) of said second specialized cis 1,4-polybutadiene rubber, and
(B) the average molecular weight (Mn) content of below 100,000 of the second specialized cis 1,4-polybutadiene rubber is at least 2 percentage points greater than the average molecular weight (Mn) content of below 100,000 for the first specialized cis 1,4-polybutadiene rubber.

14. The tire of claim 1 wherein said first and second specialized cis 1,4-polybutadiene rubber are products of polymerization of cis 1,3 butadiene monomer in the presence of neodymium based catalyst.

15. The tire of claim 1 wherein said first and second specialized cis 1,4-polybutadiene elastomers are products of polymerization of cis 1,3-butadiene monomer in the presence of a combination of neodymium compound comprised of neodymium carboxylate and alkyl aluminum compound wherein said second specialized cis 1,4-polybutadiene is treated with at least one of sulfur chloride and disulfur dichloride.

16. The tire of claim 11 wherein said first and second specialized cis 1,4-polybutadiene elastomers are products of polymerization of cis 1,3-butadiene monomer in the presence of a combination of neodymium compound comprised of neodymium carboxylate and alkyl aluminum compound wherein said second specialized cis 1,4-polybutadiene is treated with at least one of sulfur chloride and disulfur dichloride.

17. The tire of claim 1 wherein said additional diene-based elastomers are comprised of at least one of cis 1,4-polyisoprene rubber and styrene/butadiene rubber.

18. The tire of claim 11 wherein said additional diene-based elastomers are comprised of at least one of cis 1,4-polyisoprene rubber and styrene/butadiene rubber.

* * * * *